United States Patent [19]

Agazzi

[11] Patent Number: 5,818,740
[45] Date of Patent: Oct. 6, 1998

[54] DECIMATOR FOR USE WITH A MODEM WITH TIME INVARIANT ECHO PATH

[75] Inventor: Oscar Ernesto Agazzi, Florham Park, N.J.

[73] Assignee: Lucent Technologies Inc., Murray Hill, N.J.

[21] Appl. No.: 679,537

[22] Filed: Jul. 12, 1996

Related U.S. Application Data

[60] Continuation of Ser. No. 267,728, Jun. 29, 1994, abandoned, which is a division of Ser. No. 763,800, Sep. 23, 1991, Pat. No. 5,384,806.

[51] Int. Cl.[6] .................................................. G06F 17/17
[52] U.S. Cl. ...................................... 364/724.1; 375/222
[58] Field of Search ........................... 364/724.01, 724.1, 364/724.13, 724.16, 724.17; 375/222, 354

[56] References Cited

U.S. PATENT DOCUMENTS

| | | | |
|---|---|---|---|
| 5,051,981 | 9/1991 | Kline | 370/32.1 |
| 5,325,318 | 6/1994 | Harris et al. | 364/724.17 |
| 5,369,606 | 11/1994 | Hessel | 364/724.1 |

*Primary Examiner*—Reba I. Elmore
*Assistant Examiner*—Emmanuel L. Moise

[57] ABSTRACT

An ISDN modem. The modem includes an independent clock which controls the modem's input and output filters and two dependent clocks whose rates are functions of the independent clock and which are synchronized with external timing signals. When a dependent clock is synchronized, timing adjustment signals to other components of the modem specify the type and direction of synchronization. One of the dependent clocks and the independent clock are used to control a decimator which provides two samples of a symbol which are one independent clock cycle apart. The decimator, in conjunction with other elements, employs low frequency filters in selectively providing time-invariant samples. Advantageously, the use of low frequency filters reduces the overall circuit complexity and power consumption of the decimator. One of the samples is a primary sample from which the symbol is interpreted and the other is a secondary sample which is used to continually train a jitter canceller. When a clock is synchronized, the secondary sample becomes the primary sample, providing the modem with a time-invariant echo path. On clock synchronization, the jitter canceller responds to the timing adjustment signals by providing adaptation information to the linear echo canceller.

9 Claims, 5 Drawing Sheets

FIG. 8
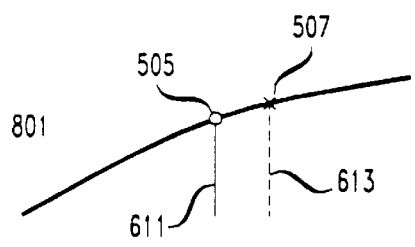
FIG. 8A
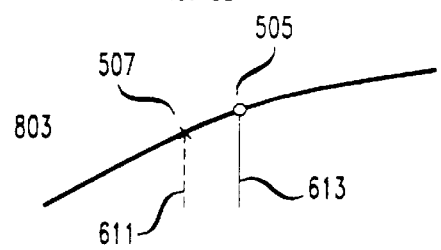
FIG. 8B
FIG. 9
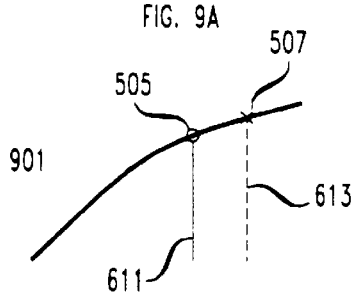
FIG. 9A
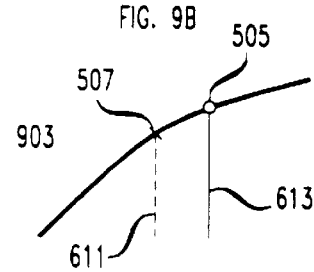
FIG. 9B
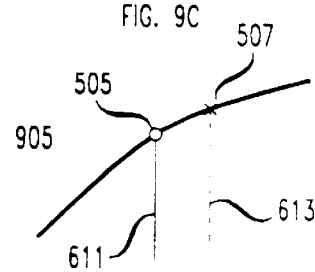
FIG. 9C
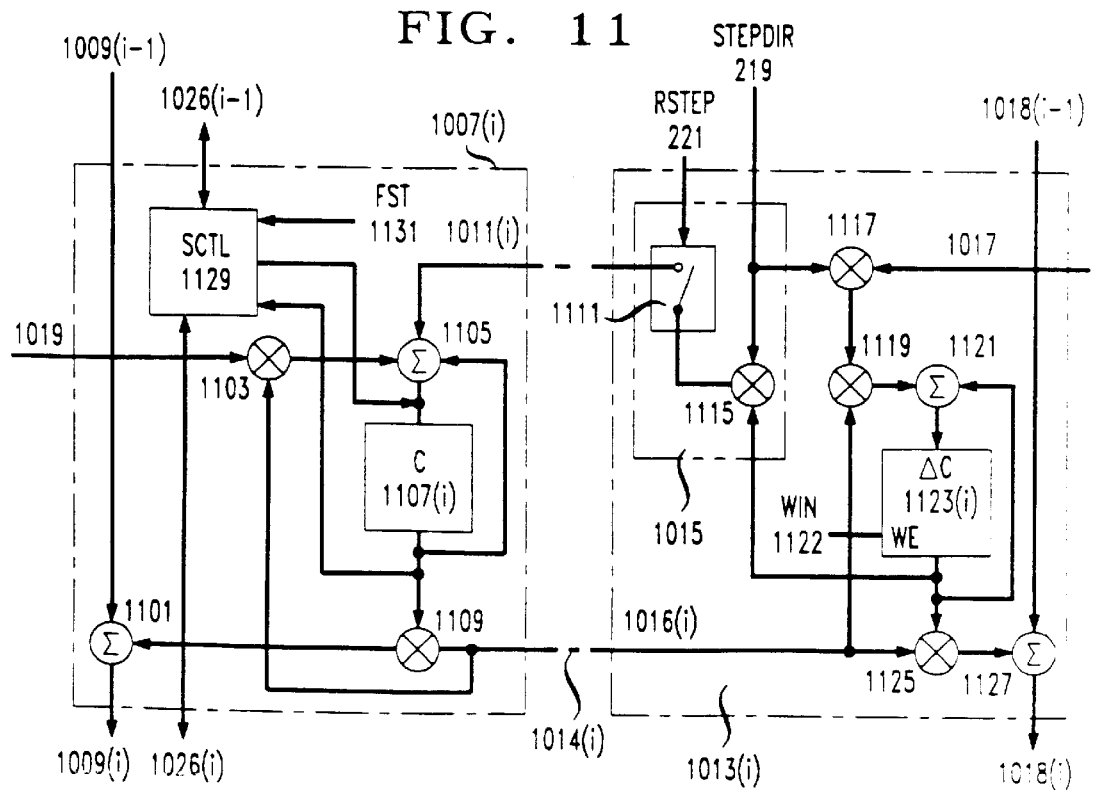
FIG. 11

DECIMATOR FOR USE WITH A MODEM WITH TIME INVARIANT ECHO PATH

This application is a continuation of U.S. application Ser. No. 08/267,728 filed on Jun. 29, 1994, now abandoned, which is a division of U.S. application Ser. No. 07/763,800 filed on Sep. 23, 1991, now U.S. Pat. No. 5,384,806 issued on Jan. 24, 1995.

BACKGROUND OF THE INVENTION

1. Field of the Invention

The invention relates generally to modems and more particularly a decimator used with to modems employing transmission media subject to echoes.

DESCRIPTION OF THE PRIOR ART

Integrated services digital network (ISDN) service is a service offered by telephone companies in which subscribers are offered data as well as voice transmission services. A major barrier to the expansion of ISDN service has been the unavailability of ISDN modems which combine low cost with high performance and low power consumption.

One reason for the unavailability of such modems has been the demanding environment in which such modems operate. The modems employed in ISDN must communicate across a telephone subscriber loop. The loop may be up to 18 kilofeet long, may be made of a number of different cable types, and may include a number of bridge taps. In this environment, a signal being received in a modem may be 30–40 decibels lower than the echo of the signal produced by the modem itself as it transmits. The faintness of the received signal in comparison with the echo requires that any ISDN modem used on a subscriber loop have very high quality echo cancellation. A particular problem with providing such echo cancellation for modems used in subscriber loops is that the properties of the subscriber loop as a transmission medium vary over time. As the properties of the subscriber loop vary, the timing of the signals received by the modem changes. The modem's internal timing must be synchronized with the timing of the signals, and consequently, the modem must occasionally adjust its internal timing.

The best technique available for synchronizing the modem's internal timing with the timing of the signals is the digital phase locked loop. Digital phase locked loops are easily implementable in integrated circuits, and the implementations are easily manufactured and tested. Digital phase locked loops are thus the technique of choice in low-cost modems. However, digital phase locked loops make echo cancellation more difficult. When a digital phase locked loop is employed, timing changes are made in discrete steps. Such changes add timing jitter to the echo cancellation, and the echo cancellation is degraded unless the timing jitter is taken into account. See D. G. Messerschmitt, "Asynchronous and timing jitter insensitive data echo cancellation," *IEEE Trans. Commun.*, vol. COM-34, December 1987, pp. 1209–1217. One reason for the unavailability of low-cost ISDN modems suitable for use in subscriber loops has been the lack of low-cost techniques for compensating for timing jitter.

It is an object of the apparatus and methods disclosed herein to provide a high-performance modem with improved manufacturability and testability. In the course of attaining this objective, other objectives have been attained, including effective and low-cost echo cancellation in the presence of timing jitter, jitter compensation employing continuous adaptation of coefficients, timing circuits which permit the use of low-cost, wide tolerance crystals, and improved decimator circuits.

SUMMARY OF THE INVENTION

In one aspect, the invention is a modem which includes timing recovery means for synchronizing a dependent clock signal with timing information derived from a sequence of signals originating externally to the modem, transmit filter means for outputting a sequence of output signals to a transmitting medium, and receive filter means for receiving a sequence of input signals from a receiving medium, the modem being characterized in that the transmit filter means and the receive filter means are discrete time filters whose operation is not affected by variations in the dependent clock signal.

Other aspects and advantages of the modem disclosed herein will become apparent to those of ordinary skill in the art upon study of the following Drawing and Detailed Description.

BRIEF DESCRIPTION OF THE DRAWING

FIG. 8 is a diagram of the manner in which the samples of the input signal change in response to a change in direction of a timing step;

FIG. 9 is a diagram of the manner in which the samples of the input signal change in response to an RSTEP operation;

FIG. 11 is a detailed block diagram of certain components of the linear echo canceller and the jitter echo canceller.

Figure 1:
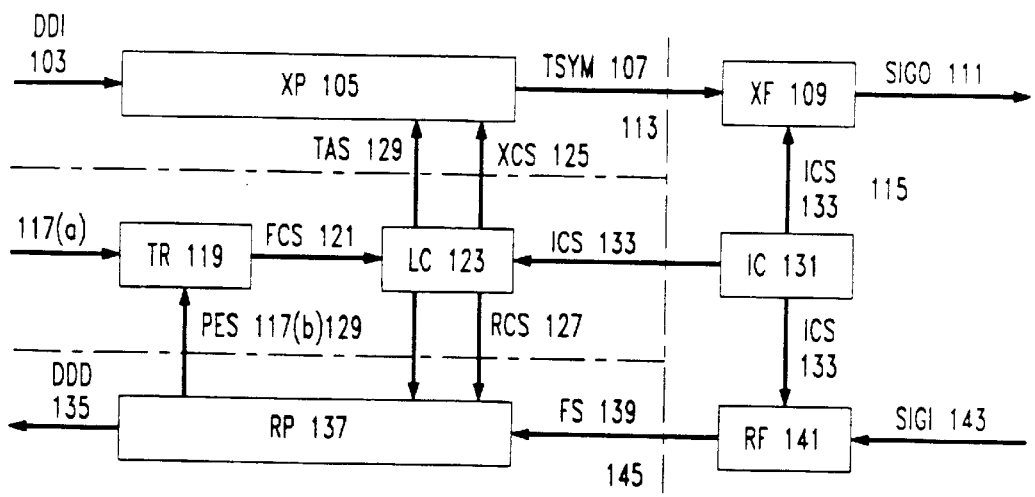
FIG. 1 is a high-level block diagram of the modem disclosed herein.

Reference numbers in the Drawing have two parts: the two least-significant digits refer to an element in a drawing; the remaining digits refer to the figure in which the element specified by the reference number first appears. Thus, an element with the reference number 411 first appears in FIG. 4.

DETAILED DESCRIPTION

The following Detailed Description will first provide an overview of a modem which is a preferred embodiment of the invention, will then provide a detailed disclosure of the operation of the timing apparatus in the modem, and will finally provide detailed disclosures of certain components of the modem which respond to timing adjustment signals generated by the timing apparatus.

Overview of a Modem Embodying the Invention: FIG. 1

FIG. 1 is a block diagram of a modem 101 embodying the invention. Modem 101 is an ISDN transceiver which is designed to be used either at the switch end of a subscriber loop or at the subscriber end. Modem 101 is a full duplex modem, i.e., modem 101 can simultaneously transmit information to and receive information from a transmission medium. Transmitted information comes from a source such as a computer or a switch which provides the information in the form of digital data. Modem 101 employs transmit processor 105 to encode this input digital data (DDI) 103 into transmit symbols (TSYM) 107 and employs transmit filter 109 to convert transmit symbols 107 to output signals 111 suitable for the transmission medium.

Received information is received in the form of input signals (SIGI) 143 from the transmission medium. Modem 101 filters input signals 143 in receive filter (RF) 141 and provides the filtered signals 139 to receive processor 137. Receive processor 137 processes the filtered signals 139 to recover the symbols, which it then decodes into output digital data (DDO) 135. Details of the components of modem 101 which are relevant to the preferred embodiment of the invention are disclosed herein; the remaining details are well-known in the art and are described in standard textbooks such as Edward A. Lee, David G. Messerschmitt, *Digital Communication,* Kluwer Academic Publishers, Boston/Dordrecht/London, 1988.

Operation of the components of modem 101 is controlled by clock signals. Transmit filter 109 and receive filter 141 are discrete time filters. The clock signals which control their operation are independent clock signals 133, generated by independent clock 131. In the preferred embodiment, independent clock 131 is a crystal oscillator which provides a 15.36 MHz signal. The clock signals for the remaining components are produced by local clock 123. There are two such clock signals: transmit clock signal 125, which control the components of transmit processor 105, and receive clock signals 127, which control the components of receive processor 137. Both clock signals produced by local clock 123 have a rate of approximately 80 KHz, which is also the baud rate of modem 101.

The clock signals 125 and 127 produced by local clock 123 are derived from independent clock 131, but are dependent on timing signals external to modem 101 and must be adjusted to synchronize with the external timing signals. The nature of the dependencies is determined by whether modem 101 is being used at the switch end or the subscriber end of the loop. The simplest case is when modem 101 is being used at the subscriber end. In that case, both transmit clock signal 125 and receive clock signal 127 are synchronized with a timing signal extracted from input signals 143.

When modem 101 is being used at the switch end, there are two external timing signals, one provided by the switch, and one extracted from input signals 143. Both clock signals 125 and 127 are dependent on the external timing signal provided by the switch, while receive clock signal 127 is additionally dependent on the timing signal extracted from input signal 143. In operation, transmit clock signal 125 is always synchronized with the timing signal provided by the switch, while receive clock signal 127 begins in a state of synchronization with the timing signal provided by the switch, but is then adjusted to synchronize it with the timing signal extracted from input signal 143, and may therefore be out of phase with transmit clock signal 125.

Synchronization of clocks 125 and 127 happens in response to phase error signals 117. These signals indicate how much a clock 125 or 127 is out of phase with an external clock from which it is dependent. Phase error signal 117(*a*) indicates the amount by which clock signals 125 and 127 in a modem 101 installed at the switch end are out of phase with the timing signal provided by the switch; phase error signal 117(*b*) indicates the amount by which clock signal 127 in a modem 101 installed at the switch end and both clock signals 125 and 127 in a modem 101 installed at the subscriber end are out of phase with the timing signal extracted from input signal 143.

Phase error signals 117(*a*) and (*b*) are received by timing recovery 119. Timing recovery 119 responds to the signals by producing frequency control signals 121, which control local clock 123 and cause it to bring its clock signals 125 and 127 into phase with the external timing signals. Further, since transmit processor 105 and receive processor 137 must take certain actions to deal with changes in transmit clock signal 125 and receive clock signal 127 respectively, local clock 123 provides timing adjustment signals 129 indicating timing adjustment operations to transmit processor 105 and receive processor 137. There are two such operations: in an FSTEP operation, both clock signal 125 and clock signal 127 are adjusted together; in an RSTEP operation, only receive clock signal 127 is adjusted.

As will be explained in more detail in the following, several important advantages of modem 101 flow from the fact that transmit filter 109 and receive filter 141 are controlled by independent clock 131 instead of by local clock 123. Other advantages flow from the fact that transmit clock signal 125 and receive clock signal 127 are separately adjustable. Modem 101 thus has a three-clock architecture.

Figure 2:
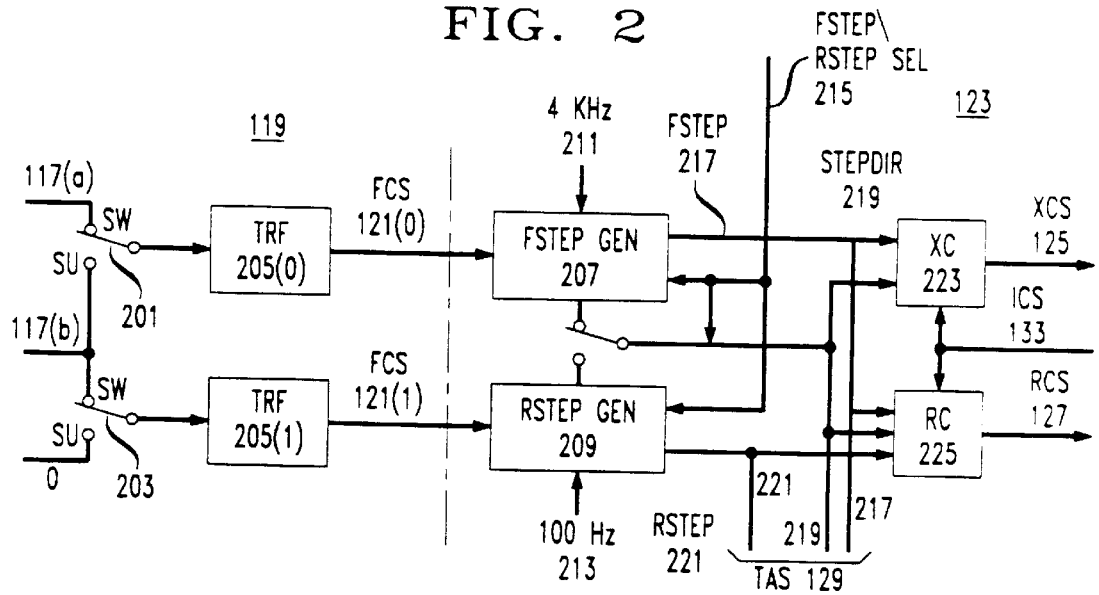
FIG. 2 is a block diagram of a portion of the clock architecture of the modem.
Figure 3:
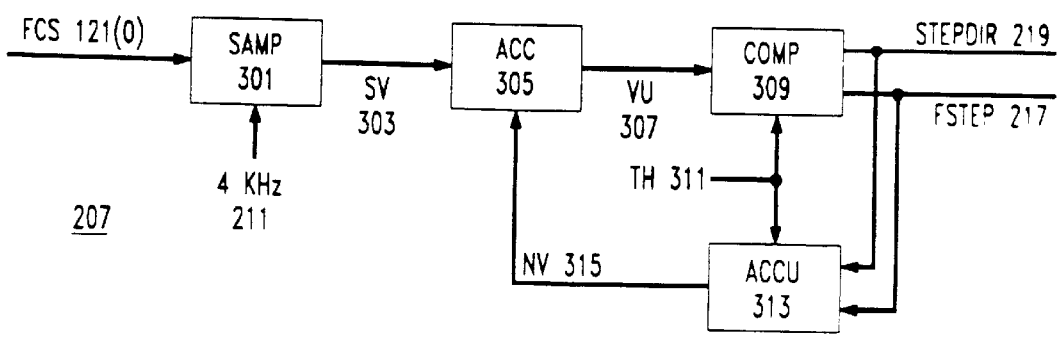
FIG. 3 is a block diagram of logic for generating timing adjustment signals in the modem.

Details of Timing Recovery 119 and Local Clock 123: FIGS. 2 and 3

As shown in FIG. 1, local clock 123 provides two clock signals, transmit clock signal 125 and receive clock signal 127. FIG. 2 shows the sources of these signals and the manner in which the signals are synchronized with the external timing signals from which phase error signal 117(*a* or *b*) is derived. The source of transmit clock signal 125 is transmit clock 223; the source of receive clock signal 127 is receive clock 225; each of these clocks works by dividing independent clock signal 133 by a factor which is determined by the need to speed the clock up or slow the clock down in order to synchronize it with the external timing signals.

In a preferred embodiment of modem 101, the external timing signals derived from input signals 143 have a frequency which is approximately 80 KHz, the baud rate of modem 101. Variations in the frequency of the external timing signals are caused by conditions in the transmission medium through which the input signals 243 are being transmitted. The external timing signals provided by the switch have a frequency of approximately 8 KHz., which, when multiplied by 10, is 80 Khz. The frequency 80 KHz can be derived from the frequency 15.36 MHz by dividing that frequency by 192. Consequently, each of clocks 223 and 225 can divide the 15.36 MHz signal 133 provided by independent clock 131 by 191, 192, and 193. Division by 192 is used when the clock 223 or 225 is synchronized with the relevant external timing signal; division by 191 is used when the clock 223 or 225 must be speeded up to synchronize it with the relevant external timing signal; division by 193 is used when the clock 223 or 225 must be slowed down to synchronize it. In a preferred embodiment, the division is carried out by generating the timing signal produced by the relevant clock each time a counter which responds to independent clock signal 133 has counted 191, 192, or 193 of clock signals 133.

Whether the counter counts 191, 192, or 193 is determined by a pair of signals input to each clock. In the case of transmit clock 223, the signals are FSTEP 217 and STEPDIR 219; in the case of receive clock 225, the signals are FSTEP 217, RSTEP 221 and STEPDIR 219. FSTEP 217 indicates that transmit clock 223 and receive clock 225 are to be simultaneously synchronized with the relevant external timing signal, while RSTEP 221 indicates that receive clock 225 is to be synchronized with the relevant external timing signal independently of transmit clock 223. For both signals, the value 1 indicates that synchronization is necessary. STEPDIR indicates whether the relevant clock is to be speeded up or slowed down to achieve synchronization; in a preferred embodiment, a value of 0 indicates that the clock is to be slowed down and 1 that it is to be speeded up. Thus, as long as FSTEP 217 has the value 1 and STEPDIR has the value 0, the counters in both transmit clock 223 and receive clock 225 count to 193; as long as FSTEP 217 has the value 1 and STEPDIR has the value 1, the counters in both clocks count to 191. Similarly, as long as RSTEP 221 has the value 1 and STEPDIR has the value 0, the counter in receive clock 225 counts to 193; as long as RSTEP 221 has the value 1 and STEPDIR has the value 1, the counter counts to 191. As may be seen from FIG. 2, RSTEP 221, STEPDIR 219, and FSTEP 217 make up timing adjustment signals 129, which are provided to components of modem 101 which must take into account the fact that transmit clock 223 or receive clock 225 has speeded up or slowed down.

The values of RSTEP 221, FSTEP 217, and STEPDIR 217 depend on the relationship between the current rates of transmit clock 223, receive clock 225, and one or both of the external timing signals. At the subscriber end of the loop, the only external timing signal available is the one derived from input signals 143 and the only synchronization operation possible is an FSTEP operation in response to FSTEP 217 which speeds up or slows down both transmit clock 223 and receive clock 225 as specified by STEPDIR 219. At the switch end of the loop, clocks 223 and 225 must both be synchronized to the external timing signal provided by the switch, while receive clock 225 must also be synchronized to the timing signal derived from input signals 143. Synchronization to the timing signal provided by the switch is done by means of an FSTEP operation, while synchronization of receive clock 225 to the timing signal derived from input signals 143 is done by means of an RSTEP operation. In both cases, STEPDIR 217 again indicates the direction.

As is apparent from the foregoing, FSTEP operations in a modem 101 installed at the subscriber end are performed in response to phase error signal 117(*b*) (derived from input signals 143), while FSTEP operations in a modem 101 installed at the switch end are performed in response to phase error signal 117(*a*) (derived from the switch) and RSTEP operations are performed in response to error signal 117(*b*). As shown in FIG. 2, which phase error signals 117(*a* or *b*) are used to determine whether FSTEP and RSTEP operations are performed in a given modem 101 is determined by switches 201 and 203, which are set when modem 101 is installed. "sw" at a terminal of the switch indicates that the switch is closed in that direction when modem 101 is at the switch end of the subscriber loop; "su" at a terminal indicates that the switch is closed in that direction when modem 101 is at the subscriber end. Thus, when modem 101 is installed at the switch end, phase error signal 117(*a*) from the switch is used to derive FSTEP 217, while phase error signal 117(*b*) is used to derive RSTEP 221; on the other hand, when modem 101 is installed at the subscriber end, phase error signal 117(*b*) is used to derive FSTEPS 217, while no RSTEPs 221 are derived at all, since switch 203 selects an input of 0 to timing recovery filter 205(1) and frequency control signal 121(1) consequently always indicates perfect synchronization.

The manner in which FSTEP 217 is generated from the relevant phase error signal 117(*a* or *b*) is the following: phase error signal 117(*a* or *b*) is input to timing recovery filter 205(0), which converts phase error signal 117(*a* or *b*) to a frequency control signal 121(0). The value of frequency control signal 121(0) is proportional to the amount and direction of phase error indicated by phase error signal 117. Frequency control signal 121(0) is input to FSTEP generator (FSTEP GEN) 207, which samples frequency control signal 121(0) at a rate of 4 KHz, as indicated by arrow 211. FSTEP GEN 207 accumulates the errors indicated by the samplings of frequency control signal 121(0), and when the accumulated errors reach a threshold value, generator 207 sets FSTEP 217 and STEPDIR 219 as indicated by the accumulated errors, reduces the accumulated error value by the threshold value, and again begins accumulating errors. FSTEP 217 and STEPDIR 219 remain so set until a further accumulation of errors makes a new setting of FSTEP 217 and STEPDIR 319 necessary.

RSTEP 221 is generated in exactly the same fashion, except that timing recover filter 205(1) and RSTEP generator 209 are used. RSTEP generator 209 samples at a rate of 100 Hz. Thus, in a preferred embodiment, FSTEP 217 may be generated at most once every 20 bauds, while RSTEP 221 may be generated at most once every 800 bauds. Clock 211 and clock 213 are both derived from receive clock signal 127. The group of 800 bauds defined by 100 Hz clock 213 is termed a timing recovery frame; 4 Khz clock 211 defines groups of 20 bauds within the group of 800 bauds; such a group of 20 bauds is termed a frequency adjustment frame. During each frequency adjustment frame but the first, FSTEP 217 and its corresponding STEPDIR 219 may be generated; during the first frequency adjustment frame of the timing recovery frame, only RSTEP 221 and its corresponding STEPDIR 219 may be generated. Selection of FSTEP generator 207 or RSTEP generator 209 is determined by FSTEP/RSTEP select signal 215. That signal is in turn determined by whether the current frequency adjustment frame is the first one of the timing recovery frame.

FIG. 3 shows a block diagram of details of FSTEP generator 207. Frequency control signal 121(0) is input to sampler 301, which samples the value of frequency control signal 121(0) at a rate of 4 KHz, as determined by clock signal 211. At each sampling, a sampled value 303 is output to accumulator 305, which adds sampled value 303 to the value of its contents. Current value 307 of accumulator 305 is output to comparator 309, where it is compared with a threshold value 311 which indicates the absolute value which must be contained in accumulator 305 in order for correction to be necessary. When current value 307 reaches or exceeds the threshold value, comparator 309 sets FSTEP 217 to 1 and STEPDIR 219 as required by the sign of the current value. When FSTEP 217 is set to 1, accumulator updater (ACCU) 313 responds to FSTEP 217 and STEPDIR 219 by subtracting the threshold value from the absolute value of current value 307, setting the sign of the result as indicated by STEPDIR 209, and loading the result into ACC 305. The process described above then begins again. RSTEP generator 209 is implemented in exactly the same fashion as FSTEP generator 207, except that the sampler in RSTEP generator 209 is controlled by clock signal 213, and thus samples at a frequency of 100 Hz.

Figure 4:
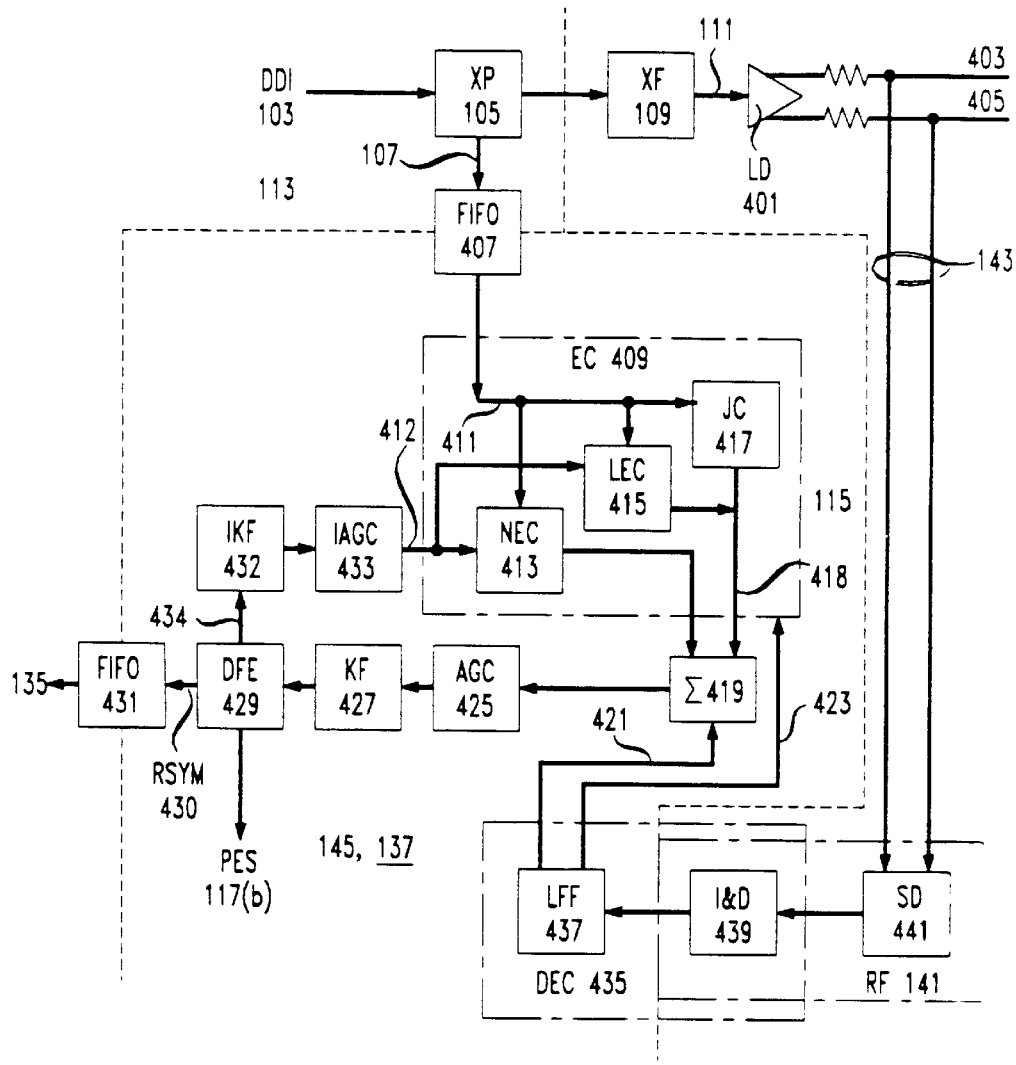
FIG. 4 is a detailed block diagram of the receive processor portion of the modem.

Details of Receive Processor 137: FIG. 4

FIG. 4 shows details of receive processor 137 in modem 101. As previously mentioned, modem 101 may be used at either end of a telephone subscriber loop. Accordingly, in a preferred embodiment, both output signals 111 and input signals 143 travel over the duplex channel provided by a twisted pair of wires. Thus, as shown in FIG. 4, output signals 111 go to line driver 401, which outputs the signals to twisted pair 403, 405. Input signals 143 similarly come from twisted pair 403, 405 to receive filter 141. A problem stemming from the use of twisted pair 403, 405 as a duplex channel is echo, that is, a signal component which has taken any path other than the direct path between the transmitting device and the receiving device. Examples of such signal components include the component which goes directly from line driver 401 to receive filter 141 of the same modem and components which result from reflections stemming from discontinuities in the subscriber loop such as changes in the gauge of the wire used and bridged taps. Input signals 143 thus include not only the signal being sent from another transmitter, but also the echo. The longer the subscriber loop, the weaker the signal being received relative to the echo, and consequently, receive processor 137 must include a component called an echo canceller which subtracts the echo from the input signals 143. As is apparent from the foregoing, efficient echo cancellation is a prerequisite for modems 101 which are employed at the ends of long subscriber loops. As will be described in more detail in the following, the use of independent clock 131 to control transmit filter 109 and receive filter 141 permits particularly efficient echo cancellation.

Continuing with the description of receive processor 137, signals 143 received on twisted pair 403, 405 include transmit symbols 105 from the sending modem, an echo component, and a component consisting of inter-symbol interference. Signals 143 are processed first by receive filter 141, which converts the signals into a sequence of digital values representing samples of the signals. In a preferred embodiment, digital filter 141 consists of sigma-delta modulator 441 analog-to-digital converter and integrate and dump component 439. Sigma-delta modulator 441 samples the signal received on the twisted pair at the rate of independent clock 131 and produces a sequence of 1's and 0's. The density of the 1's in the sequence represents the amplitude of the sampled signal. Integrate and dump component 439 sums the sequence of 1's and 0's for ½ of the period of the 80 KHz receive clock 225 and outputs the sum of the collection at the end of the ½ clock period to low frequency filter 437. Low frequency filter 437 thus receives a sequence of digital values which represent samples of the input signals 143 taken at 160 KHz. clock period. Low frequency filter 437 then samples that input to produce an 80 KHz sample of input signals 143. Integrate and dump component 439 and low frequency filter 437 together make up decimator 435, which removes out of band energy from input signal 143 and performs pulse shaping functions. The combined effect of sigma-delta modulator 441, integrate and dump component 439, and low-frequency filter 437 is thus to produce baud-rate samples of input signals 143 from which high-frequency noise has been removed.

These samples contain transmit symbols 107 from the sending modem; however, they also still contain the echo component of input signals 143 and intersymbol interference between transmit symbols 107. The echo component is removed at block 419. There, each sample produced by low frequency filter 437 has a value produced by echo canceller (EC) 409 subtracted from it. The value produced by echo canceller 409 is an approximation of the echo component of that sample of input signal 143. Thus, subtraction of the value in block 419 produces an output from that block which corresponds to input signal 143 minus the echo. Output from block 419 goes to automatic gain control 425, from there to K filter 427, and from there to decision feedback equalizer (DFE) 429, which performs three functions: it recovers symbols 107 from the samples by compensating for intersymbol interference in the samples; it recovers phase error value 117(b) from the sequence of symbols; and it determines what part of the error in the samples which it received is due to echo canceller 409 and outputs an adaptation error value 434 indicating that amount. Recovery of phase error value 117(b) and determination of adaptation error value 434 is done by detecting the received symbols (RSYM) 430, making an estimate based on the detected received symbols 430 of the values which decision feedback equalizer 429 should have received from K filter 427, comparing the estimate with the values which decision feedback equalizer 429 actually received, and using the difference between the actual value and the estimate to determine the errors in echo cancellation and in the synchronization between receive clock 225 and the timing of input signals 143.

Decision feedback equalizer 429 outputs the recovered symbols, termed hereinafter received symbols (RSYM) 430 to FIFO 431, outputs phase error value 117(b) to timing recovery block 119, and outputs adaptation error value 434 via inverse K filter 432 and inverse automatic gain control 433 to echo canceller 409. FIFO 431 is necessary because the portion of modem 101 which decodes received symbols 430 to digital data output 135 in a preferred embodiment is controlled by transmit clock 223, which, as previously explained, may be out of phase with receive clock 225. Adaptation error value 434 is derived from the signal received by decision feedback equalizer 429, and thus contains the effects of K filter 427 and automatic gain control 425 on that signal. Inverse K filter 432 and inverse automatic gain control 433 compensate for those effects, so that signal 412 received by echo canceller 409 is a close representation of the error introduced by echo canceller 409.

Continuing with details of echo canceller 409, echo canceller 409 receives as inputs transmit symbols 107 from transmit processor 105, adaptation error value 434 from decision feedback equalizer 429, and a value representing the slope of the pulse produced by low frequency filter 437 on line 423. Transmit symbols 107 are provided via FIFO 407 because, as previously described, transmit clock 223 which controls transmit processor 105 may be out of phase with receive clock 225, which controls echo canceller 409. In a preferred embodiment, echo canceller 409 has three components: non-linear echo canceller 413, linear echo canceller 415, and jitter canceller 417. Jitter canceller 417 compensates for the degradation of the echo cancellation caused by changes in the rates of transmit clock 323 and receive clock 225. Information about those aspects of echo canceller 409 which are not relevant to the present invention may be found in Lee and Messerschmitt, supra.

Interaction of Timing Adjustment with Echo Canceller 409

As previously explained, and shown in FIGS. 1 and 2 the manner in which transmit processor 105 operates is controlled by transmit clock 223 and the manner in which decimator 435 and echo canceller 409 operate is controlled by receive clock 225. Further, both transmit clock 223 and receive clock 225 may change phase together. When such a phase change happens, there will be a short interval of time during which the data received in echo canceller 409 from transmit processor 105 was provided prior to the phase change, but the symbols from which the echo is being cancelled are processed after the phase change. The result is a degradation of echo cancelling and an increase in errors in the decoding operation performed by decision feedback equalizer 429. This problem is solved in a preferred embodiment of modem 101 by using independent clock 131 to control transmit filter 109 and receive filter 141 and adapting decimator 435 and echo canceller 409 to permit phase shifts in local clocks 123. In consequence of the use of independent clock 131 and the adaptation of decimator 435 and echo canceller 409, modem 101 has a time invariant echo path, i.e., regardless of phase changes in transmit clock 223 and receive clock 225, the data from transmit processor 105 which is used to cancel an echo will always correspond to the echo in the input signal 143 being processed by decimator 435.

Detailed Description of Decimator 435: FIGS. 5–9 and 12

As explained in the discussion of timing recovery supra, the counters used to derive transmit clock 223 and receive clock 225 from independent clock 131 may count 191, 192, or 193 independent clock periods to a transmit clock period or a receive clock period. Further, the maximum change is one independent clock period, i.e., the counter may change from 191 to 192 and 192 to 193, but not from 191 to 193. Consequently, a time-invariant echo path may be achieved if two samples of the output of sigma-delta analog to digital converter 441 are made, each one independent clock period apart. For a positive change in the counter, i.e., when the clock is being slowed down, the sample presently being used must be one independent clock period behind the other sample; for a negative change in the counter, i.e., when the clock is being speeded up, the situation must be reversed.

Figure 5:
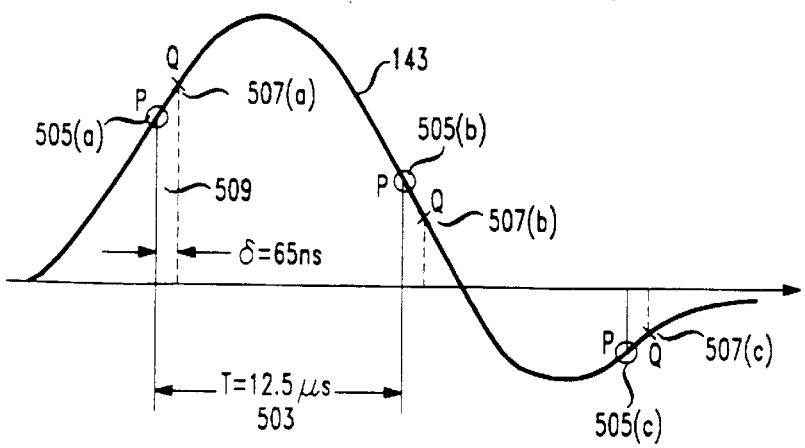
FIG. 5 is a diagram of the manner in which a filtered input signal is sampled in the modem.

The technique is illustrated in FIG. 5. Diagram 501 in that Figure shows input signal 143. In effect, decimator 435 takes two samples of input signal 143 each receive clock period 503. The samples are taken one independent clock period 509 apart. Sample 505 is the primary sample; results of that sample go via path 421 to the remaining components of receive processor 137 is processed by receive processor 137 to obtain receive symbols 430; sample 507 is the secondary sample; it goes directly to jitter canceller 417 and is used there to adapt the jitter canceller. In FIG. 5, primary sample 505 precedes secondary sample 507, indicating that clock synchronization will involve a positive change in the counter. When the counter is advanced by one, sample 507 will become the new primary sample 505 and a new secondary sample 507 will be taken one independent clock period 509 after of the new primary sample 505. When changes are made in a negative direction, the reverse is true: secondary sample 507 then precedes primary sample 505; when the counter is retarded by one, sample 507 becomes the new primary sample 505 and a new secondary sample 507 is taken one independent clock period before new primary sample 505. In a preferred embodiment, primary sample 505 and secondary sample 507 are produced by decimator 435 and replacement of sample 505 by sample 507 when a counter is advanced or retarded is controlled by time adjustment signals 129.

Figure 12:
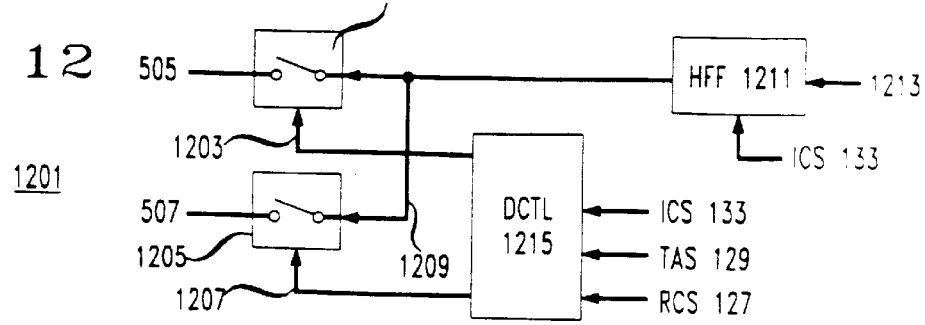
FIG. 12 is a conceptual block diagram of a two-phase decimator.

There are two important aspects of decimator 435: its production of primary sample 505 and secondary sample 507 and the manner in which decimator 435 is implemented. Both aspects represent significant advances. FIG. 12 shows how a decimator 1200 which provieds primary sample 505 and secondary sample 507 would be implemented using prior-art techniques. In FIG. 12, the stream of bits produced by sigma-delta modulator 441 appears as input 1213 to high-frequency filter (HFF) 1211. High-frequency filter 1211 converts the stream of bits received at 1213 into a sequence of digital values, each of which represents a sample of input signal 143 taken at the rate of indepenent clock 133. The sequence of values is output via 1209 to two switches, 1201 and 1205. The output of switch 1201 is primary sample 505 and the output of switch 1205 is secondary sample 507. The switches are controlled by decimator control 1215, which is responsive to independent clock signal 133, timing adjustment signals 129, and receive clock signal 127. Each of switches 1201 and 1205 remains open until a signal on control lines 1203 and 1207 respectively closes the switch. By closing the switches one independent clock period apart once each receive clock period and closing them in the order required by timing adjustment signals 129, decimator control 1215 can produce samples 505 and 507 as required.

The difficulty with decimator 1200 is that high-frequency filter 1211 must produce samples at the rate of independent clock signal 133, and consequently must process input 1213 at a very high rate of speed. Filters which can perform such high-speed processing require many components and have high power consumption. Moreover, high frequency filter 1211 produces 192 samples every receive clock period, but only two of those samples are output from switches 1201 and 1205. The remainder are simply ignored.

Figure 6:
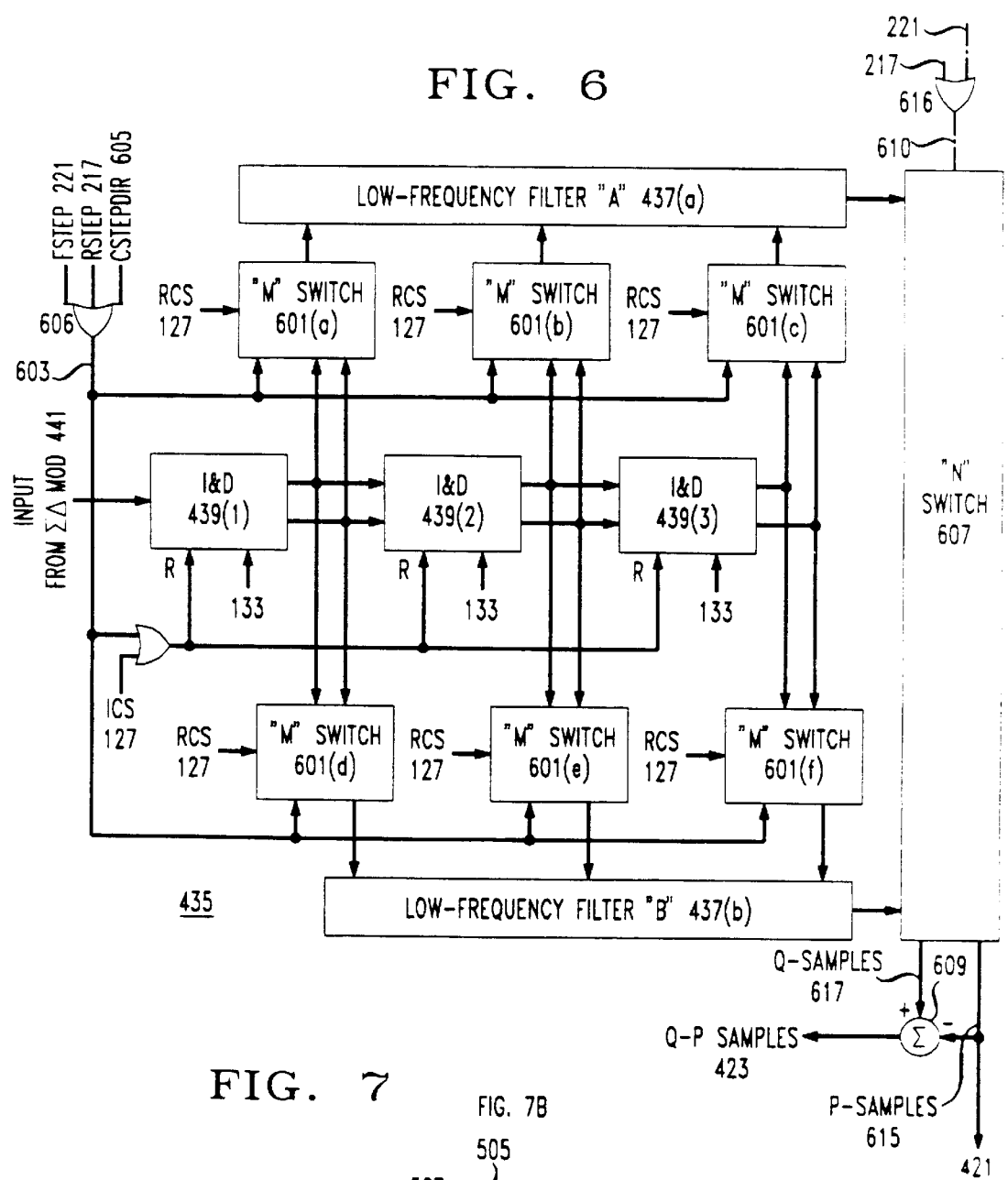
FIG. 6 is a detailed block diagram of the two-phase decimator employed in the modem.

In a preferred embodiment of modem 101, decimator 435 is implemented by means of integrate and dump blocks and a low-frequency filter instead of a high-speed filter. Switches between the integrate and dump blocks and between the low-speed filter and lines 421 and 423 provide the ability to provide samples 505 and 507 as required. FIG. 6 is a detailed block diagram of decimator 435. The main components are the following: Three integrate and dump blocks 439, each of which accumulates two samples at the rate of independent clock 133 for ½ a receive clock period 503 and outputs the pair of samples as they are accumulated on lines 611 and 613. The sample on line 613 is made one independent clock period after the sample on line 611. After the integrate and dump blocks have accumulated samples for the ½ receive clock period, they are reset. "M" switches 601 (*a* . . . *f*) select one of samples 611 and 613 every ½ receive clock period and output the selected sample. Low-frequency filters 437 (*a*) and (*b*), which are connected to the "M" switches 601, filter the inputs they receive from the "M" switches, and output a sample every receive clock period. The "M" switches 601 connected to filter 437(*a*) select one of samples 611 and 613 and those connected to filter 437(*b*) select the other sample. "N" switch 607 is connected to the outputs of filters 437(*a*) and (*b*) and either connects the output of filter 437(*a*) to line 615 and the output of filter 437(*b*) to line 617 or vice-versa.

Continuing in more detail, each integrate and dump block 439 outputs the samples it accumulates as they are accumulated both to a pair of "M" switches 601 and to the next integrate and dump block 439. The three integrate and dump blocks thus perform a triple integration of the sample received from sigma-delta modulator 441.

As may be seen from FIG. 5 and the foregoing description, the settings of the "M" switches 601 determine whether first sample 611 is output to filter 437(*a*) and second sample 613 to filter 437(*b*) or vice-versa, and the setting of "N" switch 607 determines whether the output of filter 437(*a*) goes to line 615, which carries primary sample 505, and that of filter 437(*b*) to line 617, which carries secondary sample 507, or vice-versa. Selection of inputs by the "M" switches 601 is controlled by RSTEP signal 221, FSTEP signal 217, and the signal CSTEPDIR 605, which indicates that the signal STEPDIR 219 has changed its value. Selection of inputs by "N" switch 607 is controlled by RSTEP signal 221 and FSTEP signal 217.

Decimator 435 thus performs the same function as decimator 1201, but no high frequency filter 1211 is required. Moreover, the only penalty paid for obtaining first sample 611 and second sample 613 is the duplication of low-frequency filter 437 and the addition of "M" switches 601 and "N" switch 607. However, the integrate and dump blocks and these components together are far less complex and consume far less power than high-frequency filter 1211. Decimator 435 is thus able to provide the pair of samples needed for a time-invariant echo path and for continuous updating of the jitter canceller while retaining low complexity and low power consumption.

Continuing with the operation of decimator 435 in FSTEP and RSTEP operations and in response to a reversal in the direction of clock synchronization, we will presume in the following discussion that the last clock synchronization operation was done in response to an FSTEP signal 217, that the direction of synchronization was positive, and that as a result of the operation, "M" switches 601 were set so that first sample 611 goes to filter 437(*a*) and second sample 613 goes to filter 437(*b*), and "N" switch 607 was set so that the output of filter 437(*a*) goes to line 615 and the output of filter 437(*b*) goes to line 617. Consequently, first sample 611 is output via line 421 and functions as primary sample 507. Second sample 613 is output via line 617 and functions as secondary sample 507. Secondary sample 507 is summed at 609 with primary sample 505 to produce a value which is the difference of the two samples. The difference is output via line 423 to jitter canceller 417, where it is used to train jitter canceller 417, as will be described in detail in the discussion of that component.

Figure 7:
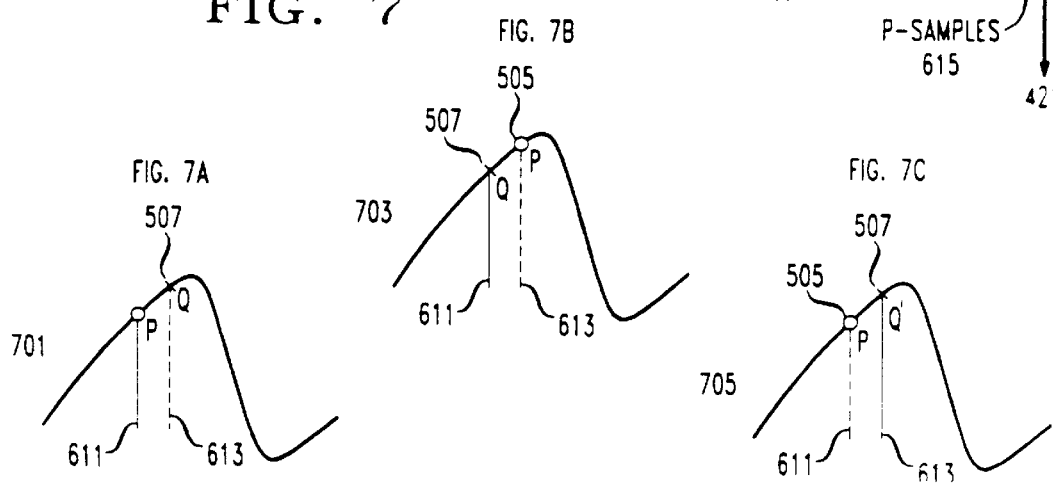
FIG. 7 is a diagram of the manner in which the samples of the input signal change in response to an FSTEP operation.

FIG. 7 shows what happens to primary sample 505 and secondary sample 506 when an FSTEP is performed and the direction of synchronization is positive. 701 shows the sampling before the operation: first sample 611 is primary sample 505 and second sample 613 is secondary sample 507. The results of the assertion of FSTEP signal 221 are shown at 703 and 705: first, as shown in 703, second sample 613 becomes primary sample 505 and first sample 611 becomes secondary sample 507. Then, as shown in 705, taking of samples 611 and 613 is delayed one independent clock cycle, and at the same time, delayed first sample 611 again becomes primary sample 505 and second sample 613 becomes a new secondary sample 507.

Implementation of the foregoing operation is as follows: FSTEP signal 221 is received via OR gate 606 and line 603 in "M" switch 601 and integrate and dump 439. It is also received via OR gate 616 and line 610 in "N" switch 607. In response to signal 221, "M" switches 601 set themselves so that first sample 611 is output to filter 437(*b*) and second sample 613 is output to filter 437(*a*), leading to the result shown at 703 of FIG. 7. At the same time, the integrate and dump blocks 439 respond to signal 221 by resetting themselves, which delays the taking of samples 611 and 613 by one independent clock cycle, and "N" switch 607 responds by setting itself so that the output of filter 437(*b*) goes to line 615 and the output of filter 437(*a*) goes to line 617, leading to the result shown at 705 of FIG. 7. As may be seen from the foregoing, decimator 435 would respond to another FSTEP signal 221 received while STEPDIR 219 continued to indicate a positive change by repeating the operation shown in FIG. 7 and described above, except that at the end, the "M" switches 601 and the "N" switch would be set so that the first sample 611 is output to filter 437(*a*), the second sample 613 to filter 437(*b*), the output of filter 437(*a*) goes to line 615, and the output for filter 437(*b*) goes to line 617.

As may be seem from OR gates 606 and 610 in FIG. 6, decimator 435 responds to an RSTEP signal 217 in the same fashion in which it responds to an FSTEP signal 221. CSTEPDIR signal 605, on the other hand, is connected only to OR gate 606, and consequently acts to change "M" switches 601 from their current setting to their other setting, and to delay sampling for one cycle, but does not affect "N" switch 607. The result of an activation of CSTEPDIR 605 in response to a change in STEPDIR 219 is shown in FIG. 8. The figure presupposes that the change was from a positive to a negative direction. 801 shows the relationships between first sample 611 and primary sample 505 and between second sample 613 and secondary samle 507 before the activation of CSTEPDIR 605 and 802 shows the relationships after the activation of CSTEPDIR 605.

When modem 101 is installed at the subscriber end of the loop, only FSTEP operations are required; at the switch end of the loop, both FSTEP and RSTEP operations may be required, and the operations may change the phases of the clocks they concern in different directions. In a preferred embodiment, STEPDIR 219 is generally set as required for the direction of the FSTEP operation. If an RSTEP in a different direction is required, CSTEPDIR 605 is activated at least 3–4 bauds before RSTEP 221 is activated, causing the "M" switches 601 to change their settings. Then RSTEP 217 is activated, causing the "M" switches 601 to again change their settings and "N" switch 607 to change its setting. Finally, CSTEPDIR 605 is again activated immediately after RSTEP 217 to cause the "M" switches 601 to return the setting they had after the first activation of CSTEPDIR 605.

The result of the above is shown in FIG. 9, which presumes that STEPDIR 219 indicates a positive change, while a negative change is required for the RSTEP operation. 901 shows the situation prior to the beginning of the operation: since STEPDIR 219 indicates a positive change, primary sample 505 is taken from first sample 611 and secondary sample 507 from second sample 613. 903 shows the situation after CSTEPDIR 605 has been activated but before RSTEP 217 is activated; primary sample 505 is now taken from second sample 613 and secondary sample 507 is now taken from first sample 611. 905 shows the situation after RSTEP 217 has been activated and CSTEPDIR 605 has been activated again: now primary sample 505 is taken from first sample 611 and secondary sample 613 is taken from second sample 613.

Figure 10:
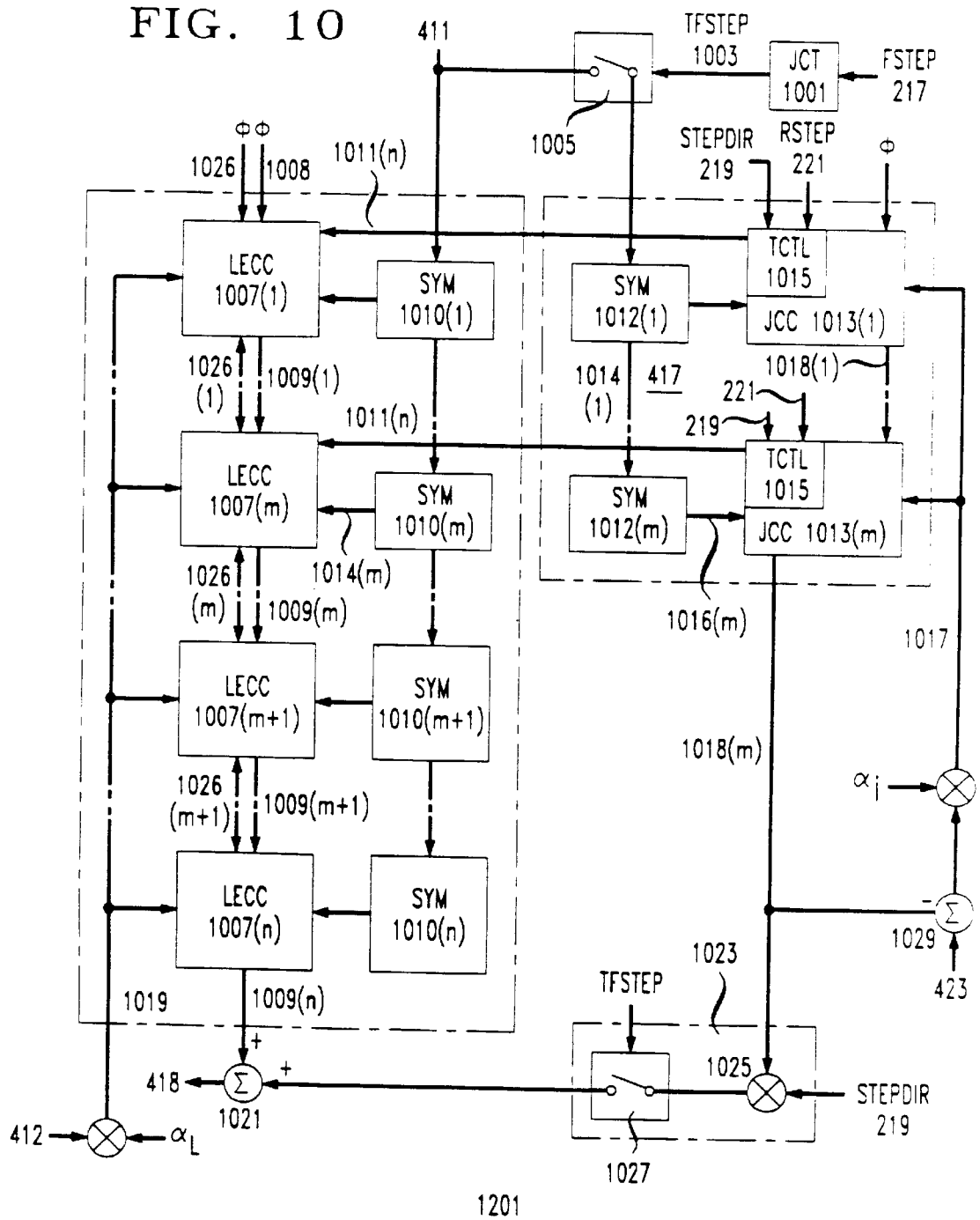
FIG. 10 is a detailed block diagram of the linear echo canceller and the jitter echo canceller in the modem.

Details of Linear Echo Canceller 415 and Jitter Canceller 417: FIGS. 10 and 11

The other components of modem 101 which must compensate for changes of phase in transmit clock 223 and receive clock 225 are linear echo canceller 415 and jitter canceller 417. These components consequently receive and respond to FSTEP 217, RSTEP 221, and STEPDIR 219; further, jitter canceller receives the difference between primary sample 505 and secondary sample 507 from decimator 435.

Overview of Cancellers 415 and 417: FIG. 10

FIG. 10 is an overview of linear echo canceller 415 and jitter canceller 417. Both are digital echo cancellers. Construction of such echo cancellers is well understood (see Chapter 18 of Lee and Messerschmitt, supra), and the following general discussion will limit itself to what is necessary for the understanding of the manner in which cancellers 415 and 417 compensate for changes in clock phases.

Generally speaking, a digital linear echo canceller includes a delay line or shift register which receives transmit symbols 107 as they are output by transmit processor 105. As each symbol is received, the previously-received symbols are shifted by one to make room for the new symbol. In FIG. 10, the delay line for linear echo canceller 415 appears as symbol registers (SYM) 1010(1 . . . *n*). In a preferred embodiment, n=32, i.e., linear echo canceller 415 employs the last 32 symbols sent by modem 10 to derive its part of the inputs to summation block 419, which subtracts the echo signal produced by echo canceller 409 from the symbols received from decimator 435 via line 421. Each symbol in registers 1010 is output to a linear echo cancelling cell (LECC) 1007(*i*) which corresponds to register 1010(*i*). There, the symbol is multiplied by a coefficient. The result of the multiplication is summed with the results of the multiplication from all of the preceding cells 1007 and is output via line 1009(*i*) to the next cell 1007. The result from cell 1007(*n*) goes via line 1009(*n*) to summer 1021.

The portion of input signal 143 which is echo of course depends on the condition of twisted pair 403, 405 to which modem 101 is connected, and the form of the symbols produced by decimator 435 further depends on the location of primary sample 505. Consequently, the coefficients in cells 1007 must be adapted to these changes. Adaptation is done in the first case in response to value 412, which, as previously described, is produced from error signal value 434, which in turn comes from decision feedback equalizer 429. In a preferred embodiment, value 412 is multiplied by a constant $\alpha_L$ which has a value of $2^{-11}$ during convergence and $2^{-10}$ in normal operation. Adaptation is done in the second case by adding coefficients from jitter canceller 417 to coefficients in linear echo canceller 415, as will be described in more detail below.

Continuing with jitter canceller 417, since the effect of a change in the location of primary sample 505 on the echo is transient, there need only be cells in jitter canceller 417 corresponding to the first m linear echo canceller cells 109. In a preferred embodiment, m=8. Jitter canceller 417 is generally similar to linear echo canceller 415. There is a delay line to hold the last m symbols transmitted by modem 101. The delay line appears in FIG. 10 as SYM 1012(1 . . . *m*). Corresponding to each SYM 1012(*i*), there is a jitter canceller cell 1013(*i*), which contains a coefficient which represents the difference for echo cancellation purposes between primary sample 505 and secondary sample 507. The contents of each SYM 1012(*i*) is multiplied by the coefficient in the corresponding cell 1013(*i*), and the result is summed with the results from the preceding cells 1013 and output via line 1018(*i*). The result from line 1018(*m*) goes via block 1023 to summer 1021 where the output of block 1023 is added to the result received on line 1009(*n*) to produce output 418, which goes to summer block 419 (see FIG. 4). The coefficients in the jitter canceller cells 1013 must of course be adapted to changes in the difference between primary sample 505 and secondary sample 507. The difference is received via line 423 from decimator 435.

The current value on line 1018(*m*) is subtracted from the difference on line 423 in summer 1029 and the result is multiplied by a constant $\alpha_j$, whose value in a preferred embodiment is 2–9. The result goes via line 1017 to cells 1013, where it is multiplied with the coefficient in a manner which will be described in more detail below.

Operation of linear echo canceller 415 and jitter canceller 417 is as follows: between FSTEP and RSTEP operations, linear echo canceller 415 continuously receives transmit symbols 107 in delay line 1010(1 . . . *n*), continuously multiplies them by the coefficients in cells 1007, and continuously outputs the result to summer 1021. The coefficients in cells 1007 are further continuously updated as required by value 412 and transmit symbols 107 (see FIG. 1). Further, switch 1005 is closed and switch 1027 is open. Switch 1027 prevents output from jitter canceller 417 from reaching summer 1021. However, switch 1005 permits transmit symbols 107 to reach delay line 1012(1 . . . *m*), and consequently the coefficients in cells 1013 are continuously updated in response to value 423 and transmit symbols 107.

Operation in response to activation of FSTEP signal 217 is as follows: Jitter counter 1001 begins running and runs for eight periods of receive clock 225. During those eight periods, jitter counter 1003 generates the signal TFSTEP 1003, which operates to open switch 1005 and to close switch 1027. Thus, during the 8 receive clock periods, jitter canceller 417 receives no transmit symbols 107 but outputs the results of its operations on the last 8 symbols received in jitter canceller 417 to summer 1021 on line 1018(*m*). Along the way, the results on line 1018(*m*) are multiplied in multiplier 1025 as determined by the value of STEPDIR 219. When STEPDIR 219=0, indicating a positive step, multiplier 1025 multiplies the results on line 1018(*m*) by 1; when STEDIR 219=1, indicating a negative step, multiplier 1025 multiplies the results by −1. Consequently, the results on line 1018(*m*) are added to the results from linear echo canceller 415 when the step is positive and subtracted when the results are negative.

As may be seen from the above description, when FSTEP signal 217 is activated, only a transient response is produced. No permanent response is required because linear echo canceller 415 is adapted to a particular relationship between the phases of transmit clock 223 and receive clock 225. The FSTEP operation maintains that relationship while simultaneously synchronizing both clocks to the relevant external timing signal, and consequently, no permanent change in linear echo canceller 415 is required.

The RSTEP operation, on the other hand, changes the relationship between transmit clock 223 and receive clock 225. Consequently, the RSTEP operation has a permanent effect on linear echo canceller 415, and the coefficients in linear echo canceller 415 must be updated accordingly. The update is carried out as follows: transfer control 1015 in jitter canceller cells 1013 operates in response to the activation of RSTEP signal 1015 to transfer the coefficient in each cell 1013(*i*) to its corresponding cell 1007(*i*) in linear echo canceller 415. As the transfer occurs, the transferred coefficient is multiplied by 1 if STEPDIR 219 has the value 0, and by −1 if it has the value 1.

A sufficient number of RSTEP operations may result in a cycle slip between transmit clock 223 and receive clock 225. Normally, FIFO 407 contains 1 symbol; if the slip was negative, FIFO 407 will contain 2 symbols; if it was positive, it will contain 0 symbols. Thus, linear echo canceller 415 can detect whether a cycle slip has occurred by monitoring the number of symbols in FIFO 407. When linear echo canceller 415 detects that a negative cycle slip has occurred, the following takes place: Delay line 1010(1 . . . *n*) is shifted so that the contents of SYM 1010(*i*) are moved to SYM 1010(*i*+2). SYM 1010(1 and 2) accommodate the symbols in the FIFO; The coefficient in each cell 1007(*i*) is shifted to cell 1007(*i*+1) on path 1026; After the shift of the coefficient, the coefficient from the corresponding jitter canceller cell 1013(*i*) is transferred as described above.

When linear echo canceller 415 detects a positive cycle slip, there is nothing in FIFO 407, and consequently no need to shift the delay line 1010(1 . . . *n*). Thus, only the following steps occur: The coefficient in each cell 1007(*i*) is shifted to cell 1007(*i*-1) on path 1026 and after the shift of the coefficient, the coefficient from the corresponding jitter canceller cell 1013(*i*) is transferred as described above.

On the shift to cell 1007(*i*+1), the coefficient in cell 1007(1) is set to 0; on the shift to cell 1007(*i*-1), the coefficient in cell 1007(*n*) is set to its former value.

Details of Cells 1009 and 1013: FIG. 11

Each linear echo canceller cell 1007(*i*) has as components register C 1107(*i*), which contains the current value of cell 1007(*i*)'s coefficient, components for applying the coefficient to the symbol contained in delay line register 1010(*i*), and components for adapting the coefficient. The components for applying the coefficient to the symbol are multiplier 1109 and summer 1101. Multiplier 1109 multiplies the symbol by the current value of the coefficient and summer 1101 sums the result of the multiplication with the result received from cell 1007(*i*-1). The result from summer 1101 goes via line 1009(*i*) to cell 1007(*i*+1).

The components for adapting the coefficient fall into two groups: those for adapting the coefficient in response to the error value from decision feedback equalizer 429 (received via line 1019) and those for adapting the coefficient in response to an RSTEP operation. The first group consists of multiplier 1103, which multiplies the symbol by the value on line 1019, and summer 1105, which sums the result of the multiplication with the current value of the coefficient. The result of the operation in summer 1105 is stored in register 1107(*i*) as the new value of the coefficient.

The second group, used in the RSTEP operation, includes components for transferring coefficients from jitter canceller cell 1013(*i*) to linear echo canceller cell 1007(*i*) and components for shifting coefficients from linear eccho canceller cell 1007(*i*) to linear echo canceller cell 1007(*i*+1) or (*i*-1). The components for transferring coefficients include line 1011(*i*), which receives the value of the coefficient from the corresponding jitter canceller block 1013(*i*), and again, summer 1105, which adds the value of the received coefficient to the current coefficient. The result is again stored in register 1107(*i*). The components for shifting coefficients include path 1026, which carries coefficients between cells 1007, and shift control (SCTL) 1129, which responds to the signal FST 1131, indicating whether FIFO 407 has 0, 1, or 2 symbols, by shifting the contents of C 1107(*i*) in the proper direction.

Continuing with jitter canceller block 1013(*i*), the current value of the coefficient in block 1013(*i*) is stored in register Δ C 1123(*i*). The remaining components fall into three groups: components for applying the coefficient to the contents of delay line register 1012(*i*), components for outputting it to the corresponding non-linear echo canceller cell 1009(*i*), and components for adapting it in response to value 1017, which in turn is derived from the difference between primary sample 505 and secondary sample 507.

Beginning with the components for applying the coefficient to the contents of delay line register 1012, these include multiplier 1125 and summer 1127. Multiplier 1125 multiplies the symbol in delay line register 1012(*i*) by the current value of the coefficient. The result goes to summer 1127, which sums it with the value received on line 1018 from cell 1013(*i*-1) and outputs the result to cell 1013(*i*+1) on line 1018(*i*).

The components for outputting the coefficient to the corresponding cell 1009(*i*) make up transfer control 1015. They include switch 1111 and multiplier 1115. Multiplier 1115 multiplies the current value of register Δ C 1123(*i*) with 1 if STEPDIR 219 has the value 0, indicating a positive step, and with -1 if STEPDIR 219 has the value 1, indicating a negative step. Switch 1111 is closed when RSTEP 221 is active, outputting the result from multiplier 1115 to summer 1105. The effect is to add the contents of register 1123(*i*) to the contents of register 1107(*i*) when STEPDIR 219 indicates a positive step and subtract it when STEPDIR indicates a negative step.

The components for adapting the coefficient, finally, include multipliers 1117 and 1119, summer 1121, and write inhibit signal (WIN) 1122, which, when applied to the write enable control for register 1123(*i*), inhibits writing of register 1123(*i*), and thereby adaptation of the coefficient during the period in which primary sample 505 and secondary sample 507 are changing their relationships to first sample 611 and second sample 613. WIN 1122 is correspondingly active during the 8 receive clock cycles of an FSTEP operation and during the 4 receive clock cycles following an RSTEP operation or a reversal of STEPDIR 219. Adaptation is in response to value 1017, which in turn is derived from the difference between primary sample 505 and secondary sample 507. Multiplier 1117 multiplies value 1017 by -1 or 1, depending on whether STEPDIR 219 indicates a negative or positive step, and multiplier 1019 multiplies the result by the symbol from register 1012(*i*). The result is then summed with the current value in register 1123(*i*) and returned to that register.

Conclusion

The foregoing Detailed Description has disclosed to one of ordinary skill in the art how a modem may be constructed which has characteristics including the following: The sampling which is done to produce the signals transmitted by the modem and the sampling which is done to filter the signals received by the modem are both controlled by a clock which is independent of any external clock signal; The independent clock may be employed to speed up and slow down clocks which are dependent on external clock signals as required to synchronize those clocks with the external signals; A decimator which is responsive to the independent clock and a dependent clock and which provides a first sample and a second sample of the symbols which are received in the modem. The samples are one independent clock period apart. The decimator further provides for changing which of the samples is used as a primary sample as required to provide a time-invariant sample when the dependent clock controlling the decimator is synchronized; and The secondary sample is employed to continuously train a jitter canceller which adapts the linear echo canceller when a dependent clock is synchronized. The adaptation may be temporary or permanent, and includes provision for cycle slips between dependent clocks.

Apparatus embodying the above characteristics cooperates to provide echo cancelling of a quality sufficient to permit use of the modem in any subscriber loop which satisfies the ANSI standard for telephone subscriber loops.

As will be apparent to those skilled in the art, the techniques employed in the modem are not limited to ISDN modems, but may be employed in modems generally. The techniques may further be used in any situation where a time-invariant signal path is required or where the effects of timing jitter must be compensated for. The modem disclosed herein is implemented in an integrated circuit; however, the techniques are in no way dependent on that implementation.

As a consequence of the general applicability of the techniques disclosed herein, the Detailed Description is not to be understood as restricting or limiting the inventions claimed herein, but is instead to be understood as a description of an exemplary embodiment of the invention. That being the case, the scope of the inventions claimed herein is not to be determined from the Detailed Description, but rather from the attached claims as interpreted in light of the doctrine of equivalents.

I claim:

1. A decimator for use with a digitized signal, said decimator comprising:

a plurality of integrate and dump blocks for filtering said digitized signal, the output of each of particular ones of said blocks serving as input to a next block;

switching means for selectively outputting filtered samples of said digitized signal from each of said integrate and dump blocks;

a plurality of low frequency filters for receiving said filtered samples; and means for selecting a sample from the output of a particular one of said low frequency filters.

2. A decimator for use with a digitized signal, said decimator comprising:

a plurality of integrate and dump blocks for filtering said digitized signal, each of said integrate and dump blocks providing two filtered samples of said digitized signal, the output of each of particular ones of said blocks serving as input to a next block;

switching means for selectively outputting said two filtered samples from each of said integrate and dump blocks;

a first and a second low frequency filter, said first low frequency filter receiving one of said filtered samples from each of said integrate and dump blocks, and said second low frequency filter receiving the other one of said filtered samples from each of said integrate and dump blocks; and means for selecting a sample from the output of either said first low frequency filter or said second low frequency filter.

3. The decimator set forth in claim 1 or 2 wherein said selecting is made as a function of a timing adjustment signal which compensates for variations in the data communication rate of said digitized signal.

4. The decimator of claim 1 wherein said integrate and dump blocks accumulate samples of said digitized signal at a substantially invariant rate.

5. The decimator of claim 1 wherein said means for selecting further comprises a second switching means for providing said selected sample from said low frequency filters.

6. The decimator of claim 1 wherein said means for selecting further comprises:

second switching means for providing said selected sample from said low frequency filters.

7. The decimator of claim 3 wherein each of said integrate and dump blocks is reset after said outputting of said two filtered samples.

8. A decimator for use with a time-invariant digitized signal for supplying samples at a selectable phase while preserving said time invariance of said signal, said decimator comprising:

a plurality of integrate and dump blocks for filtering said digitized signal at a substantially invariant rate, the output of particular ones of said blocks serving as input to a next block;

switching means for selectively outputting two filtered samples of said digitized signal from each of said integrate and dump blocks;

a first and a second low frequency filter, said first low frequency filter receiving one of said filtered samples from each of said integrate and dump blocks, and said second low frequency filter receiving the other one of said filtered samples from each of said integrate and dump blocks; and means for selecting a sample from the output of either said first low frequency filter or said second low frequency filter, said selecting being made as a function of a timing adjustment signal which compensates for variations in the data communication rate of said digitized signal.

9. A decimator for use with a digitized signal, said decimator comprising:

a plurality of integrate and dump blocks for filtering said digitized signal, each of said integrate and dump blocks providing two filtered samples of said digitized signal at a fixed interval, the output of each of particular ones of said blocks serving as input to a next block;

switching means for selectively outputting said two filtered samples from each of said integrate and dump blocks, said switching means outputting said two filtered samples at said fixed interval;

a first and a second low frequency filter, said first low frequency filter receiving one of said filtered samples from each of said integrate and dump blocks, and said second low frequency filter receiving the other one of said filtered samples from each of said integrate and dump blocks; and means for selecting a sample from the output of either said first low frequency filter or said second low frequency filter.

* * * * *